United States Patent Office 3,102,875
Patented Sept. 3, 1963

3,102,875
POLYURETHANE REACTION PRODUCT AND
METHOD FOR MAKING SAME
Herbert L. Heiss, Anniston, Ala., assignor, by direct and mesne assignments, of one-half to Monsanto Chemical Company, St. Louis, Mo., a corporation of Delaware, and of one-half to Mobay Chemical Company, Pittsburgh, Pa., a corporation of Delaware
No Drawing. Filed Aug. 7, 1953, Ser. No. 373,036
12 Claims. (Cl. 260—77.5)

The present invention relates to a new series of resins, compositions of matter containing same and to the method of preparing such products.

The products of this invention are suitable for casting or pouring into intricate forms or crevices and are adapted for use in numerous applications, for example, as adhesives, protective coatings, components of insulating varnishes, impregnants for fibrous material to impart water resistance, flame resistance and improved hand thereto; as insulating and dielectric elements in transformers, capacitors, electrical terminals or bushings, cables or other electric devices; and as foamed-in-place resins. The products of relatively low molecular weight, that is, those derived from monoamines, monohydroxy compounds or monomercaptans, find use as plasticizers for vinyl resins and numerous other plastic materials.

In accordance with the instant invention, the new products are prepared by reacting an organic compound containing at least one urethane or thiourethane group with a compound of the general formula: $R(NCX)_n$, wherein R is an organic radical free from functional groups other than —NCX, urethane and thiourethane groups, X is selected from the group consisting of oxygen and sulfur, and $n$ is an integer having a value of at least 2, the second-mentioned reactant being employed in an amount sufficient to react with the urethane and/or thiourethane groups of the first-mentioned reactant. More specifically, the new products are prepared by reacting an organic compound containing a plurality of urethane and/or thiourethane groups with a compound of the above general formula wherein $n$ is an integer having a value of at least 2, the second-mentioned reactant being employed in an amount sufficient to react with at least two urethane groups or one thiourethane group of the first-mentioned reactant.

The organic compounds containing at least one urethane or thiourethane group and preferably a plurality of these groups may be prepared in any suitable manner. For example, compounds containing urethane groups are prepared by reacting an organic hydroxy compound, preferably an organic polyhydroxy compound, with polyisocyanates, carbamyl halides such as carbamyl chloride, urea of substituted ureas; or by reacting mono- or polyamines with halocarbonates such as chlorocarbonates. Compounds containing thiourethane groups are prepared by reacting polyisocyanates with mercaptans or polymercapto compounds.

As illustrative examples of suitable hydroxy compounds for use in the production of organic compounds containing urethane groups, there may be mentioned methyl alcohol, ethyl alcohol, propyl alcohol, isopropyl alcohol, butyl alcohol, amyl alcohol, hexyl alcohol, octyl alcohol, decyl alcohol, lauryl alcohol, allyl alcohol, oleyl alcohol, tridecyl alcohol, stearyl alcohol, methyl ricinoleate, ethyl lactate, diglycerides, monoesters of glycols, phenols, substituted phenols, alkylene oxide condensates of these hydroxy compounds, ethylene glycol, propylene glycol, butylene glycol-2,3, butylene glycol-1,3, 2-methyl pentanediol-2,4, 2-ethylhexane-diol-1,3, hexamethylene glycol, styrene glycol, N-phenyldiethanolamine, catechol, resorcinol, 2, 2-bis(4-hydroxyphenyl)propane, p,p'-dihydroxybiphenyl, decamethylene glycol; polyglycols (ether glycols) such as polyethylene glycols, diethylene glycol, triethylene glycol, tetraethylene glycol, polyethylene glycols 200, 400 and 600; polypropylene glycols, dipropylene glycol, tripropylene glycol, polypropylene glycols 400, 750, 1200 and 2000; carbowaxes 1000, 1000W, 1500; monoethers of trihydroxy compounds such as glyceryl-α-allyl ether, glyceryl-α-phenyl ether, glyceryl-α-isopropyl ether; hydroxy esters such as an ester prepared from 1 mol of dibasic acid and 2 mols of a glycol or polyglycol, a polyester prepared so that the molar ratio of glycol or polyglycol to the dibasic acid is between 2 and 1, an ester prepared from 1 mol of a dimer acid and 2 mols of a glycol or polyglycol, an ester prepared from a hydroxy acid and a glycol or polyglycol so that the molar ratio of the glycol or polyglycol to the hydroxy acid is between 0.5 and 1 and an ester prepared from 1 mol of a trihydroxy compound and 1 mol of a monobasic acid, such as the monoglyceride of eleostearic acid; trihydroxy compounds such as glycerine, triethanolamine, pyrogallol, phloroglucinol, etc., alkylene oxide condensates of glycerine, triethanolamine, pyrogallol, phloroglucinol, etc.; monoethers of tetrahydroxy compounds; esters prepared from hydroxy acid and a trihydroxy compound so that the molar ratio of the latter to the former is between 0.33 and 1, such as glycerine triricinoleate, esters prepared from 1 mol of a monobasic acid and 1 mol of a tetrahydroxy compound; tetrahydroxy compounds such as pentaerythritol, etc., alkylene oxide condensates of pentaerythritol, etc., esters prepared from 1 mol of a dibasic acid and 2 mols of a trihydroxy compound; pentahydroxy compounds, such as arabitol, xylitol, etc.; hexahydroxy compounds such as sorbitol, ducitol and mannitol, etc.

Examples of suitable compounds which may be reacted with polyisocyanates to form thiourethanes are methyl mercaptan, ethyl mercaptan, butyl mercaptan, octyl mercaptan, cyclohexyl mercaptan, octadecyl mercaptan, allyl mercaptan, phenyl mercaptan, tolyl mercaptan, α-naphthyl mercaptan, dimercaptoethane, 1,2,3-trimercaptopropane, 1,2,3-trimercaptobutane, 1,5-dimercapto-3-(mercaptomethyl)pentane, 1,6-dimercaptohexane, 1,10-dimercaptodecane, 1,6-dimercapto-3-methylhexane, 1,4-dimercaptobenzene, dimercaptoxylene, and polyvinyl mercaptan.

Illustrative examples of suitable isocyanates, isothiocyanates, carbamyl chlorides, and ureas which may be employed in the production of organic compounds containing urethane or thiourethane groups are ethyl, methyl, propyl, butyl, amyl, octyl, decyl, dodecyl, hexadecyl, octadecyl, allyl, isobutyl, isoamyl, cyclohexyl, phenyl, p-tolyl, p-chlorophenyl, m-chlorophenyl and α-naphthyl isocyanates, etc.; ethylene diisocyanate, trimethylene diisocyanate, tetramethylene diisocyanate, pentamethylene diisocyanate, etc.; and the corresponding diisothiocyanates; alkylene diisocyanates and diisothiocyanates, such as propylene-1,2-diisocyanate, butylene-1,2-diisocyanate, butylene-1,3-diisocyanate, butylene-2,3-diisocyanate, and butylene-1,3-diisothiocyanate; alkylidene diisocyanates and diisothiocyanates, such as ethylidine diisocyanate, butylidine diisocyanate and ethylidine diisothiocyanate; cycloalkylene diisocyanates and diisothiocyanates, such as cyclopentylene-1,3-diisocyanate, cyclohexylene-1,2-diisocyanate, cyclohexylene-1,3-diisocyanate, cyclohexylene-1,4-diisocyanate, and cyclohexylene-1,2-diisothiocyanate; cycloalkylidene diisocyanates and diisothiocyanates, such as cyclopentylidene diisocyanate, cyclohexylidene diisocyanate and cyclohexylidene diisothiocyanate; aromatic diisocyanates and diisothiocyanates, such as m-phenylene diisocyanate, p-phenylene diisocyanate, 1-methyl-2,4-phenylene diisocyanate, naphthylene-1, 4-diisocyanate, diphenylene-4,4'-diisocyanate or p-phenylene diisothiocyanate; aliphatic-aromatic diisocyanates or diisothiocyanates, such as xylylene-1,4-diisocyanate, xylylene-1,3-diisocyanate, 4,4'-diphenylmethane diisocyanate, 4,4'-diphenylpropane diisocyanate or xylylene-1,4-diisothiocyanate; methyl, ethyl, propyl, butyl, octyl, dodecyl, octadecyl, phenyl, cyclohexyl, p-chlorophenyl carbamyl chlorides; m-phenylene, p-phenylene, 2,4-tolylene, 4'4-xenylene bis-carbamyl chlorides; urea, methylurea, ethylurea, butylurea, phenylurea, α-naphthylurea, cyclohexylurea, s-dimethylurea, s-dicyclohexylurea, s-diphenylurea, 1,3-methylethylurea and 1,3-ethylphenylurea, etc.

Examples of amines which may be used in the preparation of organic compounds containing urethane groups are: methyl, ethyl, butyl, octyl, cyclohexyl, octadecyl, allyl amines, aniline, p-toluidine, substituted anilines and α-naphthylamine; ethylene diamine, trimethylene diamine, tetramethylene diamine, hexamethylene diamine, octamethylene diamine, decamethylene diamine, dodecamethylene diamine, N,N'-dimethyl decamethylene diamine, N,N'-dibenzyl hexamethylene diamine, cyclohexylene-1-4-diamine, ortho-phenylene diamine, m-phenylene diamine, p-phenylene diamine, benzidine, naphthalene-1,4-diamine, γ,γ'-diamino dibutyl oxide, γ,γ'-diamino dibutyl sulfide, diethylene triamine and triethylene tetramine, etc.

As typical examples of halocarbonates which may be reacted with amines to form organic compounds containing urethane groups, there may be mentioned methyl, ethyl, propyl, isopropyl, butyl, cyclohexyl, phenyl, p-tolyl and p-chlorophenyl chlorocarbonates and butylene-1,4- and hexylene-1,6- bis-chlorocarbonates, etc.

The organic compounds containing urethane and/or thiourethane groups used in the practice of the instant invention are preferably prepared by reacting an organic compound of the general formula: $R(NCX)_n$ with an organic polyhydroxy and/or polymercapto compound in the proportions providing a ratio of —NCX groups to active hydrogen atoms which is greater than 1:1 but is desirably within the range of 1.1:1 to $n$:1. More specifically, these reactants are employed in the proportions providing a ratio of —NCX groups to active hydrogen atoms which falls in the range of about 1.3:1 or 1.5:1 to about $n$:1 and preferably within the range of about 2:1 to about $n$:1. The products obtained by this reaction are adducts which contain urethane and/or thiourethane groups and also free isocyanate and/or isothiocyanate groups. Therefore, these products can be converted into more highly polymerized products by bringing out a reaction between the isocyanate and/or isothiocyanate groups of one molecule with the urethane and/or thiourethane groups of the same or another molecule. This is achieved by heating the adducts in the substantial absence of moisture or by means of catalysts. Alternatively, the organic compounds containing urethane and/or thiourethane groups and also isocyanate and/or isothiocyanate groups may be converted into a more highly polymerized state by further reaction with a polyisocyanate and/or polyisothiocyanate.

The products of the instant invention may be in the form of bubble-free resinous compositions or highly cellular resinous foams, the character of the products being dependent upon the conditions of manufacture.

For example, if a substantially bubble-free resin is desired, the reaction between the organic compound containing urethane and/or thiourethane groups with a polyisocyanate and/or polyisothiocyanate is desirably carried out in the absence of a catalyst and also moisture. On the other hand, if a cellular product is desired, the reaction is effected in the presence of a catalyst selected from the group consisting of compounds yielding in aqueous solution ionizable hydroxyl or substituted hydroxyl groups and precursors of said compounds. In either case, the products are relatively brittle resins which may be plasticized and rendered more flexible by effecting their preparation in the presence of a non-reactive organic material, and preferably a non-reactive organic liquid which boils at a temperature not lower than 200° C., and preferably not lower than 250° C., at atmospheric pressure.

As illustrative examples of non-reactive organic liquids and solids which may be used in the practice of this invention, there may be mentioned trichlorobenzene, chlorinated biphenyl, chlorinated 1,3,3-trimethyl-1-phenylindane, chlorinated 1,3,3,6-tetramethyl-1(4'-methylphenyl)-indane, dimethoxy tetraethylene glycol, diethyl phthalate, dibutyl phthalate, diamyl phthalate, butyl benzoyl benzoate, butyl phthalyl butyl glycolate, N-ethyl-para-toluene sulfonamide, diphenyl ortho-biphenyl phosphate, tricresyl phosphate, 2-ethylhexyl diphenyl phosphate, dibutyl sebacate, dibenzyl sebacate, partially hydrogenated aromatic hydrocarbon liquid mixtures such as disclosed and claimed in Patent 2,364,719, epoxidized safflower oil and petroleum and coal tar oils which boil above 200° C., and preferably above 250° C., at atmospheric pressure. In fact, any organic liquid or solid boiling within the above range which is compatible with the above adducts, the organic compounds containing urethane groups and the final resin may be employed in the practice of the instant invention.

The above-described adducts may be preformed and then added to the non-reactive organic liquid or solid and converted to a more highly polymerized state or they may be formed in situ in the organic liquid or solid and then converted to a higher state of polymerization. In either event, the plasticized polymers thus obtained vary from soft resinous gels to hard brittle resins, depending upon the amount and type of components used in their production.

For a more complete understanding of the instant invention, reference is made to the following illustrative examples, although it should be clearly understood that the invention is not limited thereto.

EXAMPLE I

*Manufacture of Substantially Bubble-Free Gels and Resins*

About 11.1 parts of triethanolamine was reacted with about 38.9 parts of m-tolylene diisocyanate in the presence of about 50 parts of chlorinated biphenyl containing 42% chlorine. The resulting mixture consisted of a white solid suspended in a yellow liquid. This liquid was separated and heated in an oven at a temperature of 100° C. for about 12 hours and a hard, clear resin was obtained.

A sample of this resin was held in a Bunsen flame and it burned with a smokey flame without melting but extinguished itself as soon as it was removed.

EXAMPLE II

About 55.5 parts of triethanolamine and about 250 parts of chlorinated biphenyl containing 42% chlorine were mixed thoroughly in a flask and then about 194.5 parts of m-tolylene diisocyanate was added with stirring. During this addition, the reaction temperature was maintained at a value not exceeding 50° C. This resulted in the production of a slurry of a solid material which was separated from the liquid by filtering. A sample of the liquid reaction product was placed in an oven at 100° C. and, after about 18 hours, the liquid solidified. The solubility of this product in various liquids was determined and it was found that the resin did not dissolve in boiling solvents such as water, methanol, acetone, hexane, benzene, carbon tetrachloride and ethyl acetate.

EXAMPLE III

A slurry containing about 39.1 parts of diethanolamine and about 250 parts of chlorinated biphenyl containing 42% chlorine was reacted with about 194.5 parts of m-tolylene diisocyanate to form a liquid product containing a relatively small proportion of solid material which was separated by filtering. The liquid product was then heated in an oven at 100° C. until it solidified into a hard, clear resin.

EXAMPLE IV

About 38.9 parts of m-tolylene diisocyanate and about 11.1 parts of triethanolamine were reacted together in the presence of about 50 parts of nuclear chlorinated isopropylbiphenyl containing about 42% chlorine. The reaction product consisted of a liquid containing a relatively small proportion of solids which were removed by filtration. The liquid portion of the reaction product was heated in an oven at 100° C. for a period of about 24 hours and a soft, yellow resinous gel was obtained.

EXAMPLE V

About 11.1 parts of triethanolamine and about 38.9 parts of m-tolylene diisocyanate were reacted together in the presence of about 50 parts of the following solvents:

Sample No. 1 Chlorinated biphenyl containing 21% chlorine
Sample No. 2 Chlorinated biphenyl containing 32% chlorine
Sample No. 3 Chlorinated biphenyl containing 42% chlorine
Sample No. 4 Chlorinated biphenyl containing 48% chlorine
Sample No. 5 Chlorinated biphenyl containing 54% chlorine
Sample No. 6 Chlorinated biphenyl containing 60% chlorine
Sample No. 7 Chlorinated naphthalene On heating to a temperature of 100° C. and for a period of about 20 hours, Samples Nos. 1–5 and 7 formed clear, amber resins whereas Sample No. 6 produced a sticky, opaque resin.

EXAMPLE VI

About 55.5 parts of triethanolamine and about 194.5 parts of m-tolylene diisocyanate were reacted together in the presence of about 250 parts of chlorinated biphenyl containing 42% chlorine. This reaction was carried out at room temperature using chlorinated biphenyl which had been previously saturated with hydrogen chloride gas. This resulted in the production of a liquid containing a relatively small proportion of solids which were removed by filtration. A sample of this liquid product was heated at a temperature of 100° C. for about 3¼ hours to form a thick gel and for a total of about 4¼ hours to form a very hard and brittle resin which was substantially free of bubbles.

EXAMPLE VII

About 8.3 parts of triethanolamine and about 41.7 parts of p,p'-diisocyanatodiphenylmethane were reacted together in the presence of about 50 parts of chlorinated biphenyl containing about 42% chlorine. The resulting reaction product was placed in a 100° C. oven and heated for about 5 hours. This resulted in the production of a hard, clear, yellow resin similar to that obtained with m-tolylene diisocyanate.

EXAMPLE VIII

About 11.1 parts of triethanolamine was dissolved in about 50 parts of molten biphenyl and to the resulting solution about 38.9 parts of m-tolylene diisocyanate was added. The product obtained as a result of the ensuing reaction was heated for about 24 hours at 100° C. and a hard, clear, light yellow resin was obtained.

EXAMPLE IX

About 10.3 parts of castor oil was reacted with about 4.7 parts of m-tolylene diisocyanate in the presence of chlorinated biphenyl containing 42% chlorine, the reaction taking place at room temperature. The product of this reaction was a clear, viscous liquid which, on heating for about 40 hours at 125° C., yielded a flexible, bubble-free resin.

EXAMPLE X m-Tolylene diisocyanate and the condensate of about 6.6 mols of propylene oxide with 1 mol of glycerine were reacted together in a molar ratio of about 3 mols of the diisocyanate to about 1 mol of the condensate, the reaction taking place in the presence of a sufficient amount of chlorinated biphenyl containing 42% chlorine to yield a 50% solution of adduct. On heating for 2¼ hours at 140° C., a sample of this solution yielded a tough, rubbery and resinous gel.

EXAMPLE XI m-Tolylene diisocyanate containing about .23% of hydrolyzable chlorine was reacted with the following alkylene oxide condensates of glycerine in a molar ratio of about 3 mols of the isocyanate to about 1 mol of the condensate, the reaction taking place in the presence of sufficient amount of chlorinated biphenyl containing 42% chlorine to yield a 50% solution of the adduct.

Condenate of about 3.1 mols of propylene oxide with 1 mol of glycerine
Condensate of about 13.2 mols of propylene oxide with 1 mol of glycerine
Condensate of about 12 mols of ethylene oxide with 1 mol of glycerine
Condensate of about 3 mols of ethylene oxide with 1 mol of glycerine The products of these reactions were all clear, viscous liquids except the solution of adduct prepared from 3.1 mols of propylene oxide with 1 mol of glycerine, which product was a cloudy, viscous liquid. On being heated to 150° C. for 3 hours, 4¾ hours, 7½ hours and 4¾ hours, respectively, these reaction products formed gels which, on continued heating for a total of 23 hours at the same temperature, produced flexible, bubble-free resins that decreased in flexibility with decreasing molecular weight of the condensate used in the preparation of the adduct.

EXAMPLE XII

Solutions of the following compositions, when heated for about 23 hours at 125° C., yielded substantially bubble-free products which varied with decreasing amounts of solvent from a soft jelly to a tough, flexible resin.

| Adduct | Percent by weight of adduct | Percent by weight of chlorinated biphenyl containing 42% chlorine |
| --- | --- | --- |
| Adduct of about 3 mols of m-tolylene diisocyanate with about 1 mol of the condensate of 13.2 mols of propylene oxide with 1 mol of glycerine | 20 | 80 |
| Do | 35 | 65 |
| Do | 65 | 35 |
| Do | 80 | 20 |

EXAMPLE XIII

Solutions of the following compositions, when heated for about 23 hours at 125° C., produced substantially bubble-free, brittle resins which increased in hardness as the amount of solvent was decreased.

| Adduct | Percent by weight of adduct | Percent by weight of chlorinated biphenyl containing 42% chlorine |
| --- | --- | --- |
| Adduct of 3 mols of m-tolylene diisocyanate with 1 mol of the condensate of 3.1 mols of propylene oxide with 1 mol of glycerine | 20 | 80 |
| Do | 35 | 65 |
| Do | 65 | 35 |
| Do | 80 | 20 |

EXAMPLE XIV

Substantially 3 mols of m-tolylene diisocyanate was reacted with the condensation product of about 13.2 mols of propylene oxide with 1 mol of glycerine in the presence of a sufficient amount of the following chlorinated compounds numbered 1-6, inclusive, to yield a 50% solution of the resulting adducts. In the remaining cases, namely, 7-9, inclusive, the condensation product was mixed with similar amounts of the melted chlorinated compound and then reacted with the m-tolylene diisocyanate.

| | Physical appearance of adduct |
|---|---|
| (1) Unrefined chlorinated biphenyl containing 48% by weight of chlorine | Dark liquid. |
| (2) Chlorinated biphenyl containing 21% chlorine | Clear, viscous liquid. |
| (3) Chlorinated biphenyl containing 32% chlorine | Do. |
| (4) Refined chlorinated biphenyl containing 48% chlorine | Do. |
| (5) Refined chlorinated biphenyl containing 54% chlorine | Do. |
| (6) Refined chlorinated biphenyl containing 60% chlorine | Very viscous, clear liquid. |
| (7) Chlorinated mixture of 60% biphenyl and 40% distilled high boiler containing 65% chlorine | Clear, extremely viscous liquid. |
| (8) Chlorinated isomeric terphenyl mixture containing 42% chlorine | Do. |
| (9) Chlorinated distilled high boiler containing 60% chlorine | Clear solid. |

The products obtained as a result of these reactions were heated at a temperature of 125° C. until a gel was formed, whereupon the heating was continued for a total of 13 hours to convert the gel into a resin. The time required to gel the above products and the type of resins formed are indicated in the following table.

| Sample No. | Total time required for sample to gel | Type of resin formed |
|---|---|---|
| 1 | Greater than 6 hours | Dark, flexible, soft, bubble-free resin. |
| 2 | 2½ hours | Flexible, bubble-free resin. |
| 3 | 1½ hours | Do. |
| 4 | do | Do. |
| 5 | Greater than 6 hours | Soft, flexible, bubble-free resin. |
| 6 | do | Soft, flexible resin with a few bubbles. |
| 7 | 1½ hours | Hard, flexible, bubble-free resin. |
| 8 | 2½ hours | Flexible, bubble-free resin. |
| 9 | do | Brittle resin with a few bubbles. |

EXAMPLE XV

Substantially 3 mols of m-tolylene diisocyanate was reacted with about 1 mol of the condensation product of about 13.2 mols of propylene oxide with 1 mol of glycerine, the reaction taking place in the presence of a sufficient amount of the following organic liquids to form a 50% solution of the adduct having the properties indicated:

| Sample No. | Organic liquid | Physical properties of solution of adduct |
|---|---|---|
| 1 | Partially hydrogenated aromatic liquid mixture having a specific gravity of about 1.004 at 25° C., a refractive index of about 1.5600 at 25° C. and a boiling range of 340° C. to 390° C. at atmospheric pressure. | Clear, viscous liquid. |
| 2 | Chlorinated 1:3:3-trimethyl-1-phenylindane. | Do. |
| 3 | Epoxidized safflower oil | Do. |
| 4 | Tricresyl phosphate | Do. |
| 5 | 2-ethylhexyl diphenyl phosphate | Do. |
| 6 | Butyl phthalyl butyl glycolate | Do. |
| 7 | Dimethoxy tetraethylene glycol | Clear liquid. |

The above products were heated at a temperature of about 125° C. until they were gelled and then the gels were heated up to a total of 22½ hours to convert them into resins. The time required for the products to gel and the properties of the resins are given in the following table.

| | Time required for sample to gel, hrs. | Type of resin formed |
|---|---|---|
| 1 | Greater than 6½ | Flexible resin with some tendency of organic liquid to exude. |
| 2 | 3½ | Flexible resin. |
| 3 | 1 | Do. |
| 4 | 5½ | Do. |
| 5 | 3 | Do. |
| 6 | 5½ | Do. |
| 7 | More than 2½ | Do. |

EXAMPLE XVI

About 3 mols of m-tolylene diisocyanate was reacted with about 1 mol of the condensate of 13.2 mols of propylene oxide with 1 mol of glycerine, the reaction being executed in the presence of a sufficient amount of tricresyl phosphate or chlorinated biphenyl containing 42% chlorine to yield 20%, 50% and 80% solutions of the adduct. A similar reaction was carried out using about 3 mols of m-tolylene diisocyanate and about 1 mol of the condensate of 3.1 mols of propylene oxide with 1 mol of glycerine. The resulting reaction products were further heated to yield resinous polymers plasticized by the solvent employed.

Similar products were also made by adding the above condensates to the following molten chlorinated compounds, reacting m-tolylene diisocyanate with the condensate in the molar ratio indicated above and then heating the resulting products to convert them into plasticized resinous polymers.

(1) A chlorinated mixture consisting of 60% biphenyl and 40% distilled high boiler containing about 65% chlorine (2) A chlorinated isomeric terphenyl mixture containing 42% chlorine (3) Chlorinated distilled high boiler containing about 60% chlorine In order to determine the temperature characteristics of these resins, they were cooled to −12° C. and heated to 200° C. and 300° C. on a Fisher-Johns melting point apparatus. All of these resins were liquid or extremely soft at 300° C. and gave off vapor. At 200° C. very little change in the nature of the resins was noted, but at −12° C., all of these resins were quite brittle.

EXAMPLE XVII

About 8 parts of the condensate of 13.2 mols of propylene oxide with 1 mol of glycerine was reacted with about 7 parts of p,p′-diisocyanatodiphenylmethane which had been pretreated with HCl gas, the reaction being executed in the presence of 15 parts of chlorinated biphenyl containing about 42% chlorine. The product of this reaction was a soft, sticky, gummy, cloudy liquid. A sample of this product was heated at 125° C. for a period of about 15 hours and a clear, flexible resin substantially free of bubbles was obtained.

EXAMPLE XVIII

A mixture of about 15 parts of chlorinated biphenyl containing 42% chlorine and about 15 parts of the adduct of about 3 mols of m-tolylene diisocyanate with about 1 mol of the condensate of 9.2 mols of ethylene oxide with 1 mol of triethanolamine was prepared and then heated at 140° C. for about 25 to 30 minutes. This yielded a clear, tough, resinous product.

EXAMPLE XIX

About 40.7 parts of the condensate of 11.98 mols of ethylene oxide with 1 mol of glycerine was reacted with about 34.3 parts of m-tolylene diisocyanate containing 0.24% hydrolyzable chlorine, the reaction being executed in the presence of about 75 parts of chlorinated biphenyl containing 54% chlorine. The product of this reaction was heated at 110° C. for about 115 hours and a clear resin was obtained. A sample of this resin was held in the flame until it was burning well and then it was withdrawn. On being withdrawn, the product did not continue to burn.

EXAMPLE XX

About 244 parts of the condensate of 11.98 mols of ethylene oxide with 1 mol of glycerine was reacted with about 205.3 parts of m-tolylene diisocyanate containing 0.24% of hydrolyzable chlorine, the reaction taking place at room temperature and in the presence of about 450 parts of chlorinated biphenyl containing 42% chlorine. This reaction yielded a product which, on heating at about 110° C. for a period of about 68 hours, produced a completely bubble-free clear, flexible and tough resin.

A sample of the product of the initial reaction was used to impregnate and/or laminate glass cloth with highly satisfactory results. In producing these products, the solution of the initial reaction product was applied to a sheet of cloth and also between two sheets of cloth and then heated to effect polymerization of the adduct.

EXAMPLE XXI

About 6.8 parts of the condensate of 11.98 mols of ethylene oxide with 1 mol of glycerine was reacted with about 8.2 parts of p,p'-diisocyanatodiphenylmethane in the presence of about 15 parts of chlorinated biphenyl containing 42% chlorine, the reaction taking place at room temperature. The isocyanate used in this reaction was pretreated with hydrogen chloride to insure the presence of a trace of HCl. The product of this reaction was a very viscous, sticky liquid which, on heating at a temperature of about 125° C. for about 15 hours, yielded a flexible, clear resin substantially free of bubbles.

EXAMPLE XXII

*Manufacture of Resinous Foams*

The procedure described in Example X was repeated except that 1% by weight of calcium oxide was added to a sample of the resulting solution of adduct. On heating this sample at 140° C. for 10 minutes, it was converted initially into a gel and finally into a porous resinous foam.

EXAMPLE XXIII

The procedure used in Example XI was repeated using m-tolylene diisocyanate which had been pretreated with hydrogen chloride, and a condensate of about 3 mols of propene oxide with 1 mol of glycerine to form a 50% solution of adduct. A sample of this solution was mixed with about 1% by weight of lead oxide and the resulting mixture heated at 140% C. for about 1¼ to 1¾ hours. This resulted in the production of a rubbery, resinous foam.

EXAMPLE XXIV

About 66.2 parts of castor oil was dissolved in about 100 parts of chlorinated biphenyl containing 54% chlorine by heating and to the resulting solution about 33.8 parts of m-tolylene diisocyanate and about 5 parts of N-methylmorpholine were successively added. After the formation of the adduct had been completed, about 1% of N-methylmorpholine and about 0.4% of benzyltrimethylammonium hydroxide were introduced with stirring. The ensuing reaction, which was carried out at room temperature, resulted in the production of a resinous foam. This product was given an additional cure by heating for 15 minutes at about 100° C. and a light colored rubbery foam of substantially uniform cell size was obtained.

EXAMPLE XXV

The preceding example was repeated using hydrogenated instead of natural castor oil. This resulted in the production of a light colored rubbery foam which was slightly firmer than that obtained in the previous example.

The organic compound containing a urethane or thiourethane group or one or more of these groups and an isocyanate and/or an isothiocyanate group is desirably prepared in the presence of a non-reactive organic plasticizer, preferably a non-reactive organic liquid plasticizer, which boils at a temperature of at least 200° C. and preferably at a temperature of at least 250° C. at atmospheric pressure. This yields a solid or a viscous liquid solution of the above organic compound, which is stable for a considerable period of time if stored at room temperature in tightly closed containers. However, if heated or treated in the manner hereinafter described, the solution is converted into a complex resinous polymer plasticized by the above-mentioned plasticizer.

The curing of the solid or viscous liquid solution of the above-mentioned organic compound is effected by heating in the substantial absence of moisture or other foreign materials containing reactive hydrogen atoms. This heating is sufficient to effect a reaction between at least one urethane or thiourethane group and an isocyanate and/or an isothiocyanate group of another molecule containing both types of functional groups. In the event that the organic compound contains only urethane or thiourethane groups, then it is cured by reaction with an added compound which contains at least one isocyanate and/or isothiocyanate group, the curing taking place at a temperature sufficient to bring about a reaction between the functional groups of the two compounds involved.

The curing operation is carried out in the absence or presence of a catalyst and at a temperature varying from room temperature up to about 225° C. or more specifically, from about 60° C. to about 200° C. and within these limits, a temperature of about 100° C. to about 125° C. is preferred.

In the production of cellular products or plastic foam, the curing is effected at room temperature by merely mixing the organic material containing a urethane or a thiourethane group or a solution thereof with a relatively small proportion of a catalyst selected from the group consisting of compounds yielding in aqueous solution ionizable hydroxyl or substituted hydroxyl groups and precursors of these compounds. The expression "substituted hydroxyl groups" signifies radicals of the formula —OX, in which X is a member selected from the group consisting of aliphatic, cycloaliphatic, aryl, alkaryl, aralkyl and substituted hydrocarbon radicals which may or may not be interrupted by non-reactive hetero atoms such as sulfur and oxygen, etc. For example, these hydrocarbon radicals may be substituted by alkyl, alkoxy, halogen and/or nitro groups. Illustrative examples of preferred catalysts within the group are the oxides or hydroxides of potassium, sodium and calcium; the oxides of magnesium, zinc and lead; the alkali metal salts and particularly the sodium salts of ortho-phenyl phenol, 2,4,5-trichlorophenol and 2,3,4,6-tetrachlorophenol; and benzyltrimethylammonium hydroxide, tetramethylammonium hydroxide, tetramethylphenylammonium hydroxide, tetraethylammonium hydroxide, etc. These catalysts may be used alone or in combination with tertiary organic amines such as N-methylmorpholine, N-ethylmorpholine, triethylamine, tripropylamine, tributylamine, triamylamine, pyridine and quinoline, etc. If desired, the rate of curing may be greatly accelerated by heating the solid or liquid solution to higher temperatures within the limits set forth above. The curing may be carried out in the absence or presence of moisture or a plasticizer.

In the production of cellular products or plastic foams, the catalyst is employed in an amount varying from about 0.001% to about 5% by weight or more specifically, within the range of about 0.1% to about 3% by weight and within these limits about 0.5% to about 1% is preferred. The percentage by weight is based upon the weight of the total reactants.

In the production of plasticized products in accordance with this invention, the liquid or solid plasticizer is desirably employed in an amount varying from about 20% to about 80% by weight, basis total weight, and within these limits about 40% to about 60% by weight is preferred. If desired, larger or smaller amounts may be employed in order to affect the desired degree of plasticization.

The plasticized products of the instant invention cannot be produced by first forming the polymerized or cured organic compound containing a urethane or thiourethane group and then incorporating the cured product with the plasticizer. In order to obtain products having satisfactory properties, the organic compound containing the urethane or thiourethane group must be intimately associated with the plasticizer and then polymerized or cured to a higher molecular state. In this operation, the organic compound containing the urethane or thiourethane group may be preformed and then added to the plasticizer or it may be formed in situ.

What I claim is:

1. A process of forming a polyurethane reaction product comprising the steps of mixing (1) a first polymer comprising a condensation product of about 100 parts by weight of propylene oxide and about 7.5 to 10 mole percent based on the propylene oxide of pentaerythritol, and (2) at least about 2 moles based on the amount of said condensation product used of an organic diisocyanate, and reacting the mixture until a second polymer having a chain length substantially greater than that of the first polymer is formed.

2. A process of forming a polyurethane reaction product comprising the steps of mixing (1) a condensation product of propylene oxide and about 7.5 to 10 mole percent based on the propylene oxide of an aliphatic polyhydric alcohol of less than 7 carbon atoms and having from 3 to 4 hydroxyl groups and (2) at least about 1½ moles per mole of condensation product of an organic diisocyanate, and reacting the mixture until a second polymer having a chain length substantially greater than that of said condensation product is formed.

3. The reaction product of (1) a condensate of propylene oxide and a polyhydric alcohol having from 3 to 4 hydroxyl groups, and (2) an organic polyisocyanate, the amount of (2) being in excess of that theoretically required to react with the reactive hydrogens of said condensate.

4. A method for making a polyurethane reaction product which comprises mixing (1) a condensate of propylene oxide and a trihydric alcohol with (2) an organic polyisocyanate in a ratio of greater than one —NCO per reactive hydrogen of said condensate, and reacting the mixture until a second polymer having a chain length greater than that of said condensate is formed.

5. A process for making a reaction product which comprises reacting (1) a condensate of propylene oxide and a polyhydric alcohol having from 3 to 4 hydroxyl groups and (2) a member selected from the group consisting of an organic polyisocyanate and an organic polyisothiocyanate, the amount of (2) being in excess of that theoretically required to react with the reactive hydrogens of said condensate.

6. The process of claim 5 wherein the said condensate is reacted with an organic polyisocyanate.

7. A process of forming a polyurethane reaction product comprising the steps of mixing in a liquid form (1) an hydroxy terminated polyether polymer which is a condensation product of propylene oxide and a polyhydric alcohol having less than 7 carbon atoms and having 3 to 4 primary hydroxyl groups, and (2) an organic diisocyanate, in an amount providing a ratio of —NCO groups to the reactive hydrogens of said polyether greater than 1 to 1, and reacting the mixture until a second polymer having a chain length substantially greater than that of said polyether polymer is formed.

8. A process of preparing a polyurethane reaction product comprising the steps of mixing (1) a liquid hydroxyl terminated polyether polymer which is a condensation product of propylene oxide and a polyhydric alcohol of less than 7 carbon atoms and having 3 to 4 hydroxyl groups, and (2) an organic polyisocyanate having 2 to 3 functional isocyanate groups in a ratio of greater than one —NCO per reactive hydrogen of said polyether polymer, and reacting the mixture to form a reaction product having a chain length substantially greater than that of said polyether polymer.

9. A product made according to the process of claim 8.

10. A process of forming a polyurethane comprising the steps of mixing (1) a condensation product of propylene oxide and glycerine, and (2) an organic polyisocyanate in a ratio of greater than one —NCO per reactive hydrogen of said condensation product, and reacting the mixture until a second polymer having a chain length substantially greater than that of said condensation product is formed.

11. A process of forming a polyurethane reaction product comprising the steps of mixing (1) a condensation product of propylene oxide and an aliphatic polyhydric alcohol of less than 7 carbon atoms and having from 3 to 4 hydroxyl groups and (2) an organic diisocyanate in a ratio providing more than one —NCO per reactive hydrogen of said condensation product, and reacting the mixture until a second polymer having a chain length substantially greater than that of said condensation product is formed.

12. A process of forming a polyurethane reaction product comprising the steps of mixing a first polymer comprising a condensation product of propylene oxide and an aliphatic polyhydric alcohol of less than 7 carbon atoms and having 3 to 4 hydroxyl groups, and at least about 2 mols, based on the amount of said condensation product, of an organic diisocyanate and reacting the mixture until a second polymer having a chain length substantially greater than the first polymer is formed.

References Cited in the file of this patent

UNITED STATES PATENTS

| | | |
|---|---|---|
| 2,349,756 | Pratt | May 23, 1944 |
| 2,511,544 | Rinke et al. | June 13, 1950 |
| 2,577,281 | Simon et al. | Dec. 4, 1951 |
| 2,621,166 | Schmidt et al. | Dec. 9, 1952 |
| 2,625,531 | Seeger | Jan. 13, 1953 |
| 2,625,532 | Seeger | Jan. 13, 1953 |
| 2,625,535 | Mastin et al. | Jan. 13, 1953 |
| 2,650,212 | Windemuth | Aug. 25, 1953 |
| 2,772,245 | Simon et al. | Nov. 27, 1956 |
| 2,779,689 | Reis | Jan. 29, 1957 |
| 2,787,601 | Detrick et al. | Apr. 2, 1957 |
| 2,948,691 | Windemuth | Aug. 9, 1960 |

FOREIGN PATENTS

| | | |
|---|---|---|
| 869,243 | France | Sept. 29, 1942 |
| 875,643 | France | Sept. 29, 1942 |
| 890,915 | France | Feb. 22, 1944 |
| 897,067 | France | Mar. 12, 1945 |

OTHER REFERENCES

De Bell: "German Plastics Practice," 1946, page 302.
"Chemical Engineering," volume 57, No. 4, April 1950, pages 165 and 166.